Figure 13:
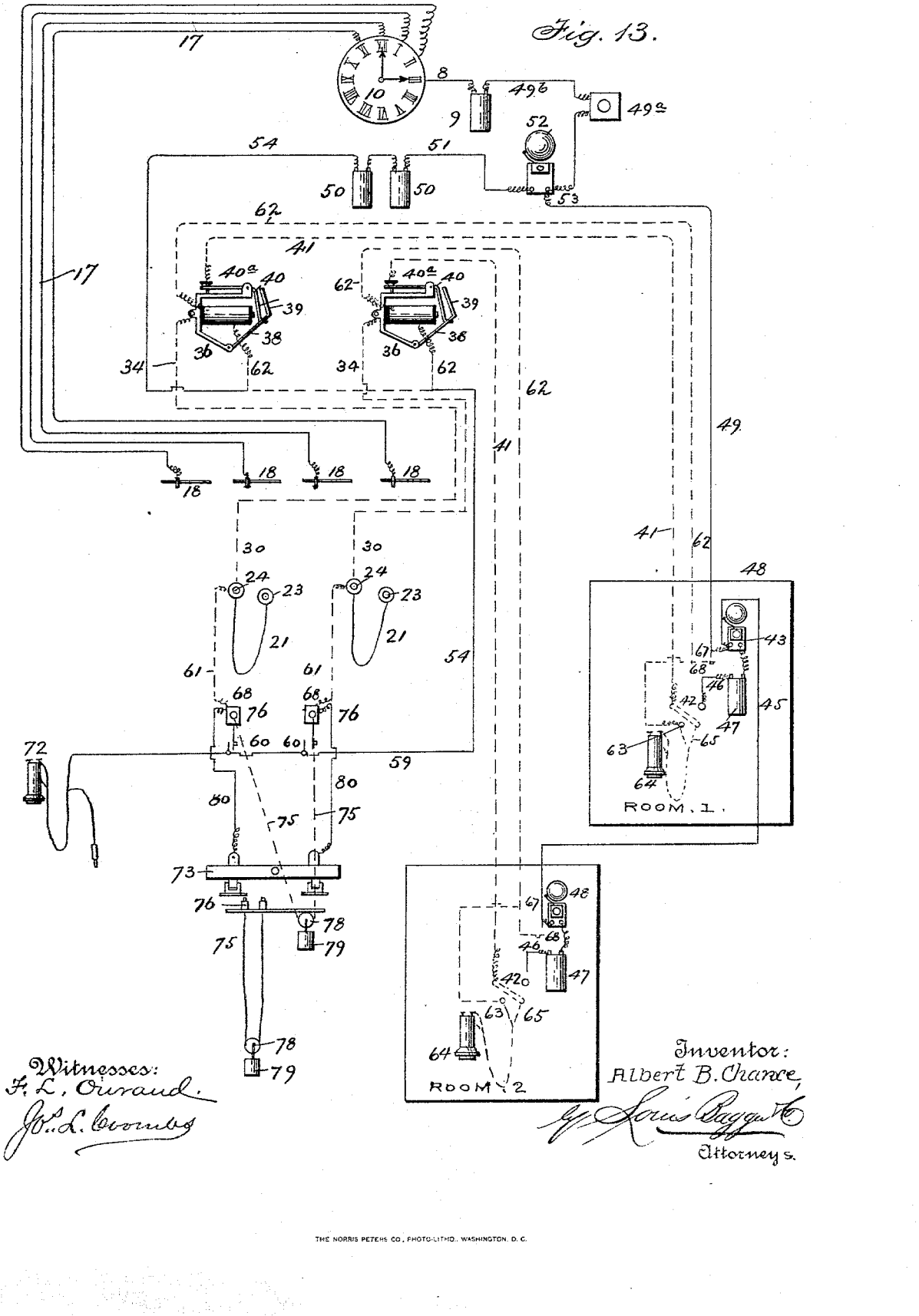

(No Model.)  8 Sheets—Sheet 1.
A. B. CHANCE.
HOTEL ELECTRIC CALL APPARATUS.
No. 584,173.  Patented June 8, 1897.
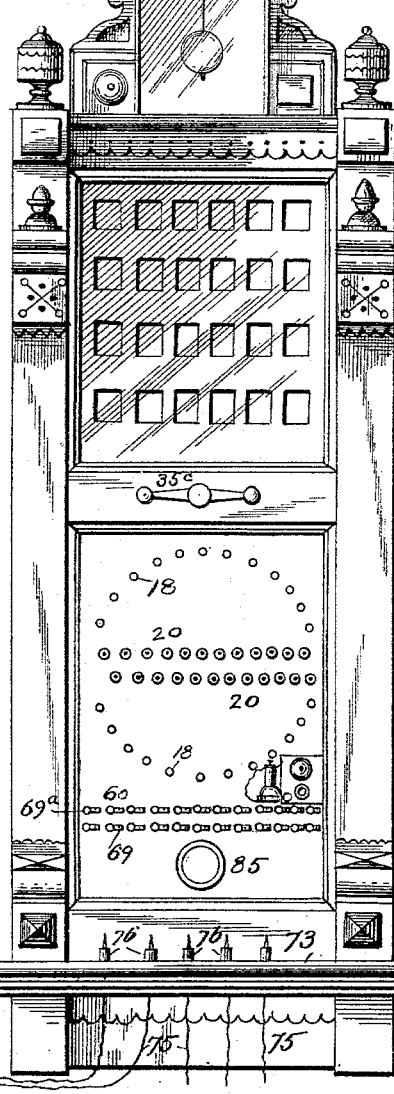
Fig. 1.
Fig. 7.
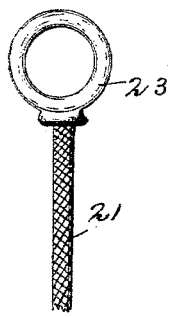
Fig. 8.
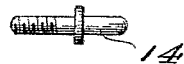
Fig. 9ᵃ
Witnesses:
Franck L. Durand
Jo. L. Loombs
Inventor:
Albert B. Chance

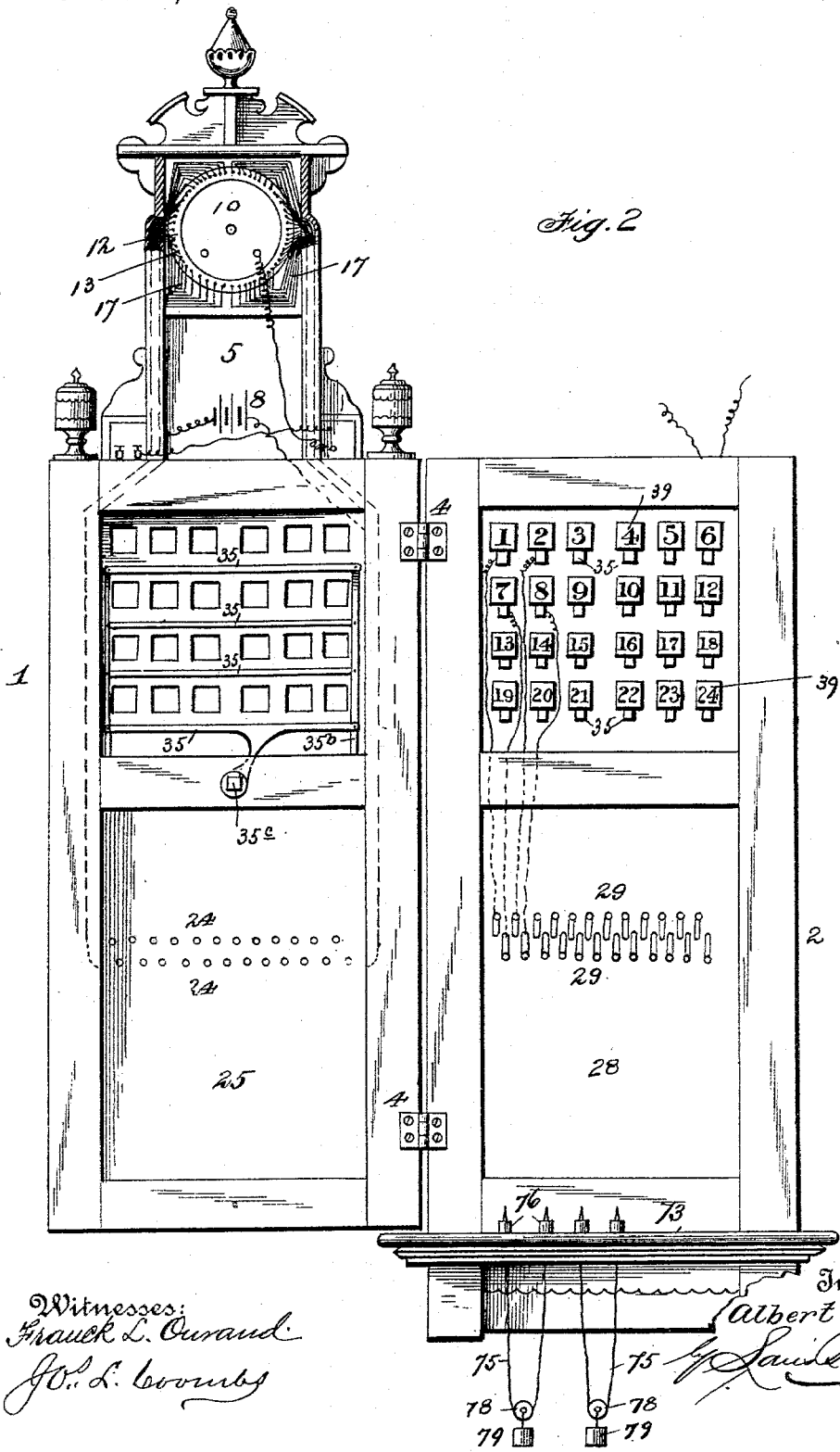

(No Model.) 8 Sheets—Sheet 3.
A. B. CHANCE.
HOTEL ELECTRIC CALL APPARATUS.
No. 584,173. Patented June 8, 1897.
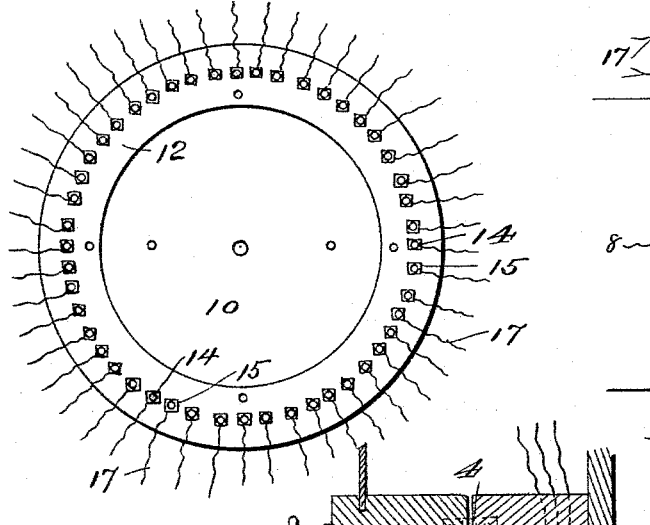
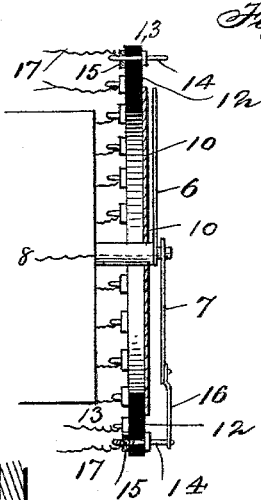
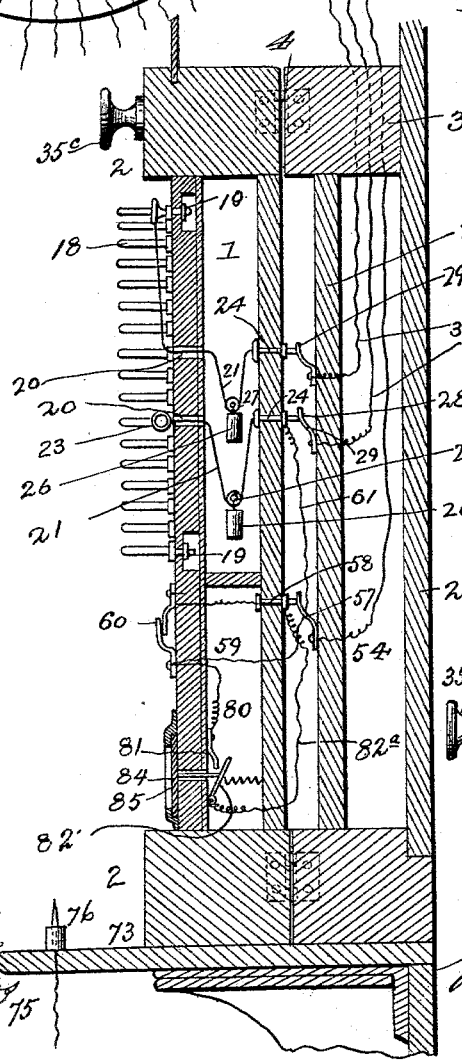
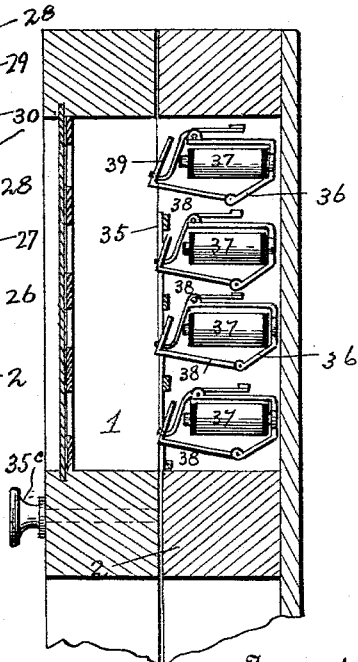
Witnesses:
F. L. Durand
Jos. L. Coombs
Inventor:
Albert B. Chance
by Saus Saggs &Co.
Attorneys

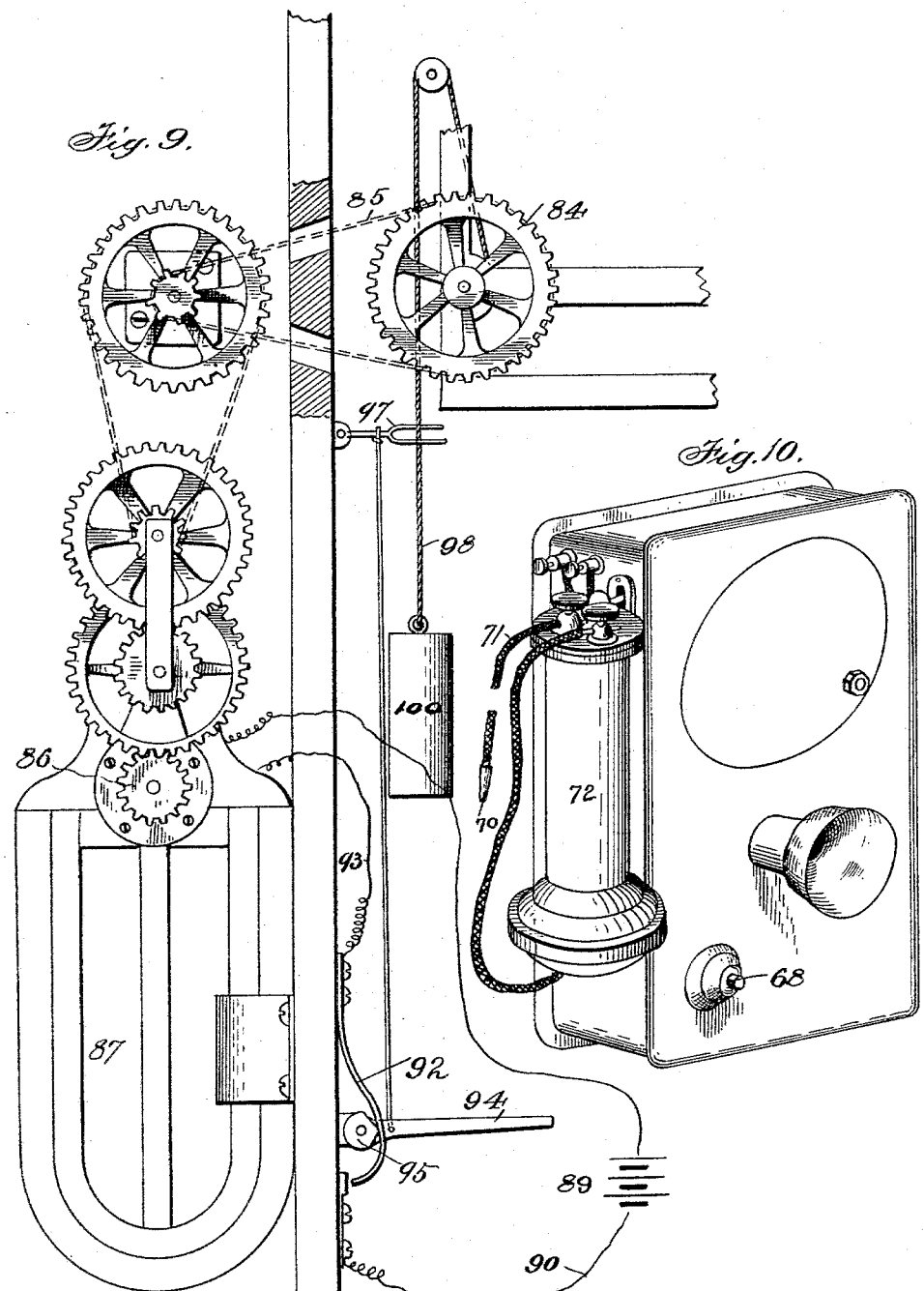

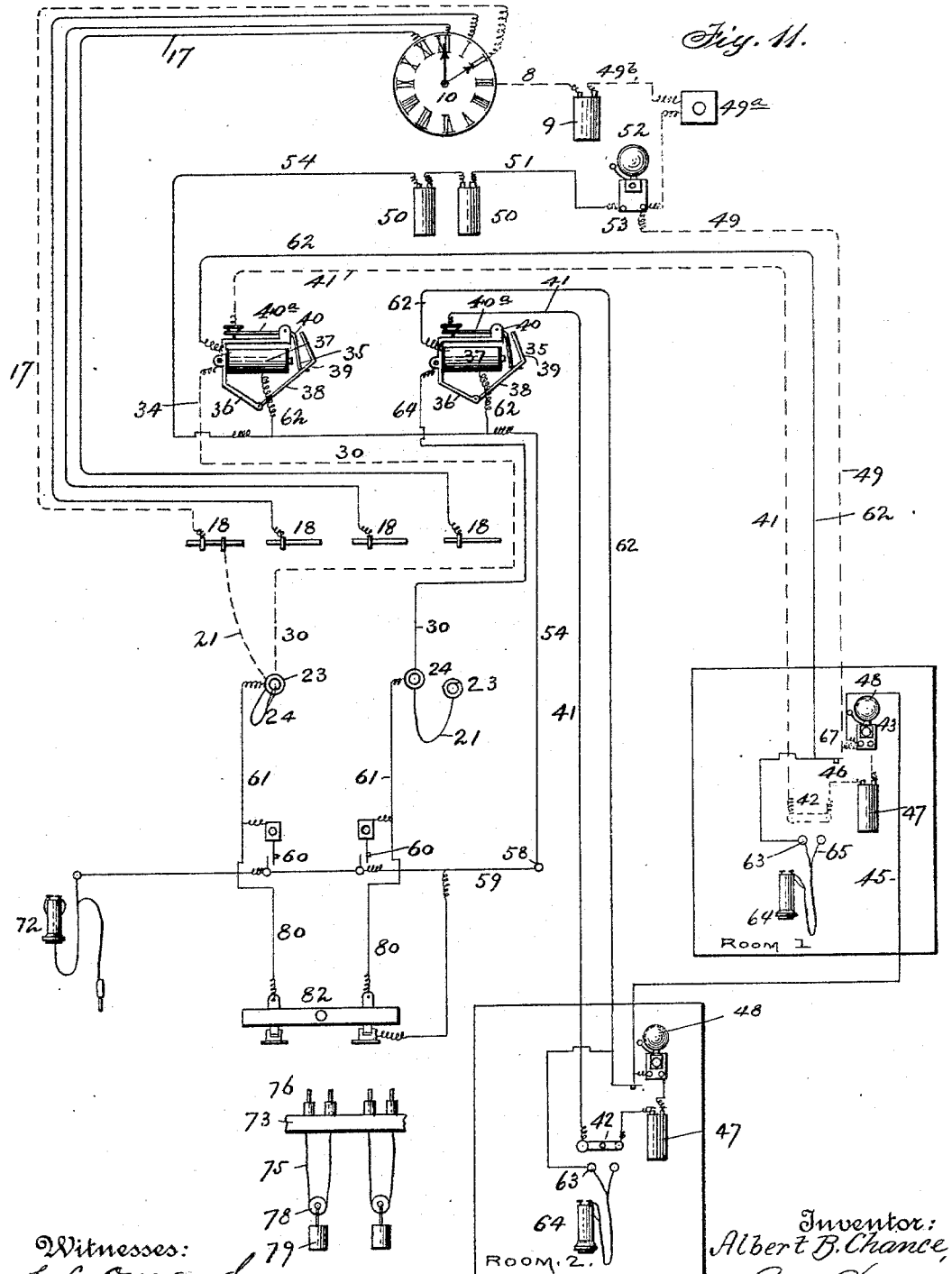

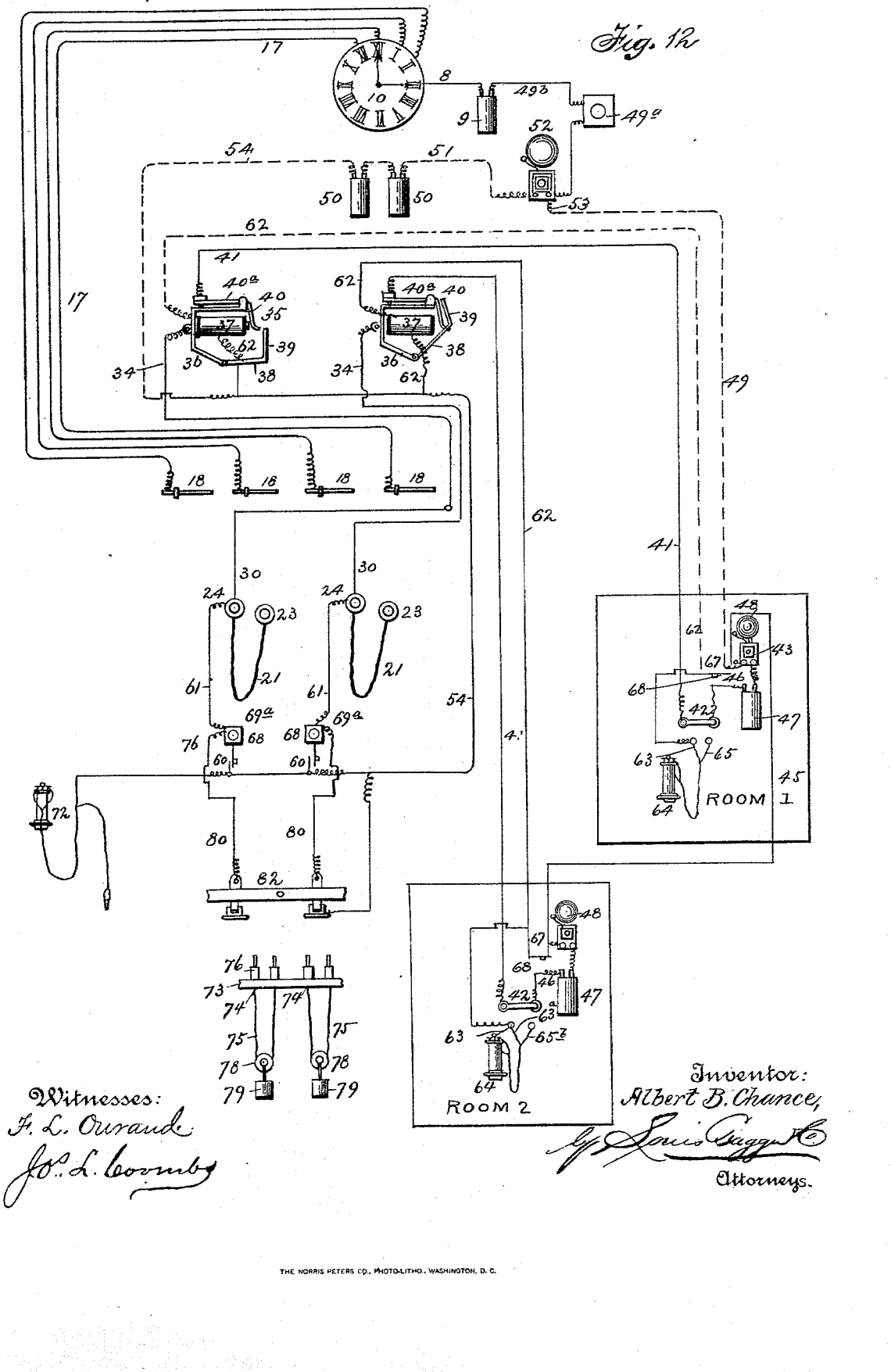

(No Model.) 8 Sheets—Sheet 7.

A. B. CHANCE.
HOTEL ELECTRIC CALL APPARATUS.

No. 584,173. Patented June 8, 1897.

Witnesses:
F. L. Ouraud.
Jo. L. Coombs

Inventor:
Albert B. Chance,
Louis Baggot
Attorneys.

(No Model.) 8 Sheets—Sheet 8.
A. B. CHANCE.
HOTEL ELECTRIC CALL APPARATUS.
No. 584,173. Patented June 8, 1897.
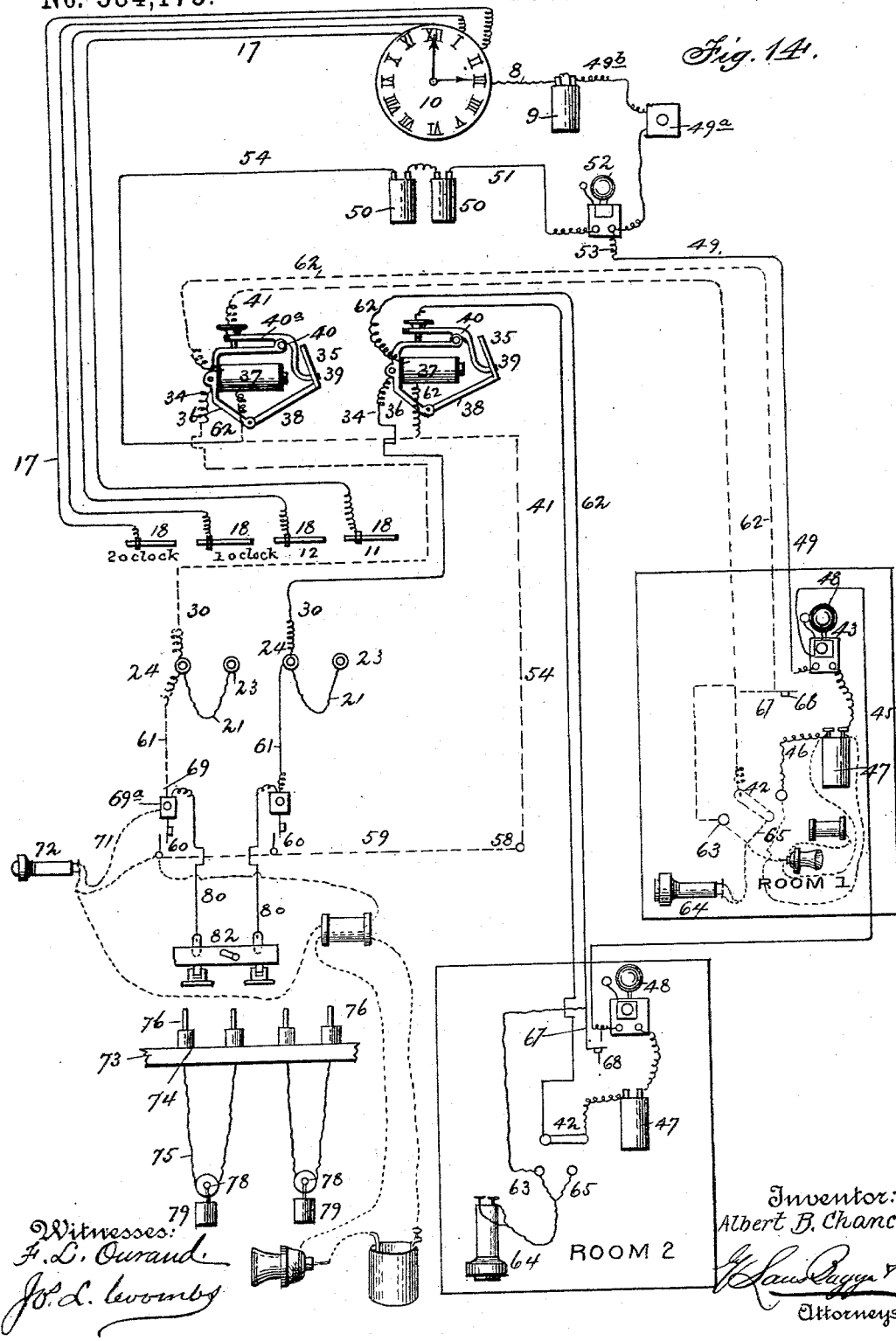

UNITED STATES PATENT OFFICE.

ALBERT B. CHANCE, OF CENTRALIA, MISSOURI.

HOTEL ELECTRIC CALL APPARATUS.

SPECIFICATION forming part of Letters Patent No. 584,173, dated June 8, 1897.

Application filed November 23, 1896. Serial No. 613,163. (No model.)

*To all whom it may concern:*

Be it known that I, ALBERT B. CHANCE, a citizen of the United States, and a resident of Centralia, in the county of Boone and State of Missouri, have invented certain new and useful Improvements in Hotel Electric Call Apparatus; and I do hereby declare that the following is a full, clear, and exact description of the invention, which will enable others skilled in the art to which it appertains to make and use the same, reference being had to the accompanying drawings, which form a part of this specification.

My invention relates to an improved call and telephone apparatus and system for use in hotels; and its object is to provide an automatic call by which the occupant or occupants of a room or rooms can be called at any predetermined time.

It is also an object to provide a telephone system by means of which the occupant of a room may communicate with the office or may communicate with the occupant of any other room without the conversation being overheard by any one in the office.

It is also an object to provide improved fire-alarm devices by which calls or alarms can be sounded in all the rooms simultaneously from the office, and it is also an object to provide means for electrically winding the clock used in connection with the apparatus.

The invention consists in the novel construction and combination of parts hereinafter fully described and claimed.

In the accompanying drawings, Figure 1 is a front view of the cabinet in the hotel-office used in connection with my invention. Fig. 2 is a similar view of the same, the front being opened. Fig. 3 is a central cross-sectional view of the clock-dial. Fig. 4 is a rear view of the dial. Fig. 5 is a cross-sectional view of the lower part of the cabinet. Fig. 6 is a similar view of the upper portion. Fig. 7 is a detail view of one of the time-pins. Fig. 8 is a similar view of one of the rings which engage therewith. Fig. 9 is a detail elevation, on an enlarged scale, of the clock-winding mechanism. Fig. 9ª is a view of one of the pins. Fig. 10 is a view of the telephone-box. Figs. 11, 12, 13, and 14 are diagrammatic views showing the different circuits.

In the said drawings the reference-numeral 1 designates a cabinet or casing to be located in the office of the hotel. This is preferably made in two sections 2 and 3, hinged to each other at 4 for the purpose of allowing access to be had to the parts in the interior thereof. Supported on the top of this cabinet is a clock 5, provided with any ordinary or suitable movement. (Not shown.)

The numerals 6 and 7 designate the minute and hour hands, respectively, the latter of which has its hub electrically connected by a wire 8 with a battery 9, located in the cabinet.

The numeral 10 designates the clock-dial, which has secured to it an annulus 12 of non-conducting material, perforated with a number of holes 13. There are preferably forty-eight of these holes, equidistant from each other, and every fourth hole registering with one of the hour-graduations on the dial. This number of holes will allow calls to be made at intervals of fifteen minutes each, if desired, as will hereinafter appear. Located in these holes are pins 14, secured in place by means of nuts 15, and their front ends project slightly beyond the face of the dial and contact with a platinum spring-arm 16, secured to the hour-hand, as the latter revolves. Connected with each one of these pins is a conducting-wire 17, leading down into the cabinet, as seen more clearly in Fig. 2. Each of these wires is connected with what I term a "time-pin" 18, of metal or other conducting material. These pins pass through a corresponding number of holes arranged in a circle in the front of the cabinet and are secured in place by nuts 19; also formed in the front of the cabinet are a number of holes 20, corresponding with the number of rooms in which calls are located. There are twenty-four such holes shown in the present instance arranged in two horizontal rows. Passing through these holes are flexible conductors 21, provided at their outer ends with conducting-rings 23, adapted to engage with said time-pins. The other ends of these conductors are secured to binding-posts 24, passing through alined holes in the back 25 of the front section 2 of the cabinet. Small weights 26 are connected with said conductors, which latter pass around pulleys 27, connected therewith, for the purpose of drawing the conductors down when not in use. The rings 23 are larger than the holes 20, so that they cannot pass through said holes when the conductors are thus pulled down.

Secured to the front 28 of the back section 2 of the cabinet are a number of contact-springs 29, corresponding in number and aline with the binding-posts, so that when said sections are closed they will contact with the binding-posts, so as to make an electrical connection therebetween. Connected with these spring-contacts are conducting-wires 30, leading to similar contact-pieces 31 in the upper part of the casing, which contact with binding-posts 32. Connected with these binding-posts by wires 34 are a number of annunciators or drops 35, corresponding with the number of the rooms, and each of which is thus electrically connected with one of the binding-posts to which the flexible conductors 21 are connected. Each of these annunciators consists of a conducting-frame 36, secured to the back of the front section 2, and is provided with a helix 37, the connections of which will be hereinafter described. Each frame on its lower side is provided with a hinged conducting-arm 38, provided with a plate 39, having thereon the number of the room. This plate engages with the bent end of a spring-actuated armature 40, hinged to a conducting-plate $40^a$, secured to but insulated from the frame of the annunciator. Connected with this plate is a wire 41, leading to the switch 42 of any ordinary telephone 43. Each annunciator is thus connected with a telephone in the correspondingly-numbered room, and the room-call batteries are all electrically connected by the line-wires 45.

Below the hinged arms of the annunciators are horizontal rods $35^a$, pivotally connected with the cabinet, connected with a vertical rod $35^d$, provided with an operating-rod $35^b$, provided with a knob $35^c$. By pushing this rod upward the annunciator or drop plates can be elevated to normal position to engage with the armatures. The said switch is adapted to contact with a wire 46, leading to a battery 47, which I term the "room-call" battery, connected with the call-bell 48 by wire $46^a$. Also connected with said bell is a wire 49, connected with a buzzer $49^a$ of any ordinary construction, which in turn is connected with the battery 9, which I term the "clock-battery," by wire $49^b$.

Located in the cabinet is a two-call battery 50, which I term the "annunciator-battery," from one terminal of which extends a wire 51, connected with a call-bell 52, which is connected by a wire 53 with wire 49. The other terminal of this battery is connected by wire 54 with a spring-contact 57 (see Fig. 5) in the front of the rear section 2 of the cabinet, which contacts with a binding-post 58, which is connected by wires 59 with one terminal of a series of push-buttons 60, one for each room. The other terminals of the push-buttons are connected with the binding-posts 24 by means of wires 61. Connected with the wire 54 are wires 62, one for each annunciator, which are wound around the helices thereof and extended to and connected with a binding-post 63, connected with a telephone-receiver 64 by wire $63^a$, the other wire $63^b$ of the receiver being connected with contact-piece 65, adapted to contact with one end of the telephone-switch. Also connected with wires 62 by wires 67 are push-buttons 68, which when pressed in establish electrical connection between the wires 49 and the wires 62.

Each of the push-buttons 60 is provided with a brass plate 69, provided with a hole $69^a$ to receive the plug 70 of the wire 71 of a receiver 72, the other wire of which is connected with other terminals of the push-buttons. At the lower part of the cabinet is a shelf 73, provided with a number of holes 74, passing through which are the ends of flexible conductors 75, having switch-plugs 76 secured to said ends adapted to be inserted in the holes of the plates secured to the push-buttons. These conductors are connected with small pulleys 78, which in turn are connected with weights 79.

Connected with the upper terminals of the push-buttons 60 by wires 80 are spring-contacts 81, secured to the inner side of the front of the cabinet, and in rear thereof is a hinged conducting-bar 82, electrically connected with the binding-post of wire 54 by wire $82^a$. A coiled spring 83 presses against this bar 82, and at its center the cabinet is provided with a pin 84, extending through the front of the cabinet and bearing against a glass plate 85. This plate serves to keep the bar 82 out of contact with the contact-springs 81 until it is broken, as in the case of a fire, when the spring 83 will press the bar against said contact-springs, establishing a circuit through the call-bells of all the rooms and sounding continuous alarms in the rooms.

The cabinet and telephones are provided with transmitters, which may be of any ordinary or suitable construction, and the receivers hang upon the hooks of the switches to cut out the telephones.

For automatically winding the clock when run down I provide the following means: Secured to the winding-shaft of the clock-movement is a sprocket-wheel 84, connected by intermediate sprocket-chains 85 with a train of gearing actuated by a sprocket-pinion 86 on the armature-shaft of a small motor 87, secured to the back of the clock.

The numeral 89 designates a battery, the positive wire 90 of which is connected with a contact-piece 91, secured to the back of the clock. Above this contact-piece is a spring-contact 92, from which extend wires 93 to the armature and field magnets of the motor and from thence to the negative pole of battery. Pivoted to a lug secured to the clock-case is a trip-lever 94, provided with a cam 95, which engages with the spring-contact 92, and connected with this lever is a vertical rod 96, connected with a forked or bifurcated lever 97, pivoted to a lug secured to the clock-case. Secured to the winding-shaft of the clock-movement is a cord 98, passing over a pulley 99, down between the forks of lever 97, and provided with a weight 100. As the clock runs down the weight will strike lever 94, turning it down, allowing contact-spring 92 to come into contact with piece 91, and establishing the circuit between the battery and the motor, when the latter will rotate the winding-shaft, winding up the cord until the weight comes in contact with the forked lever, which will be tripped, throwing up lever 94 and breaking the circuit.

I will now describe the operation, referring to the diagrammatic Figs. 11, 12, 13, 14, and 15, which represent the invention in use with two rooms of a hotel, the broken lines indicating the circuits.

Supposing that the guest or occupant of room No. 1 desires to be called at two o'clock, then the clerk takes the ring 23 of the flexible conductor 21 of said room (see Fig. 11) and engages it with the time-pin 18 corresponding with such hour, said pins being numbered like the dial of the clock. As the hour-hand travels around the dial of the clock the platinum spring-contact secured thereto will successively contact with the pins 14. When the said hand reaches the two-o'clock point, the spring contact or finger contacting with the pin 14 at such point will establish a circuit and sound a call in the room.

The circuit is as follows: from clock-battery 9, wire 49$^b$, buzzer 49$^a$, and wire 49 to call-bell in room, from thence to battery 47, wire 46, switch 42, wire 41, conducting-plate 40$^a$, armature 40, annunciator-plate 39, hinged arm 38, frame 36, wires 34 and 30, binding-post 24, conductor 21, time-pin 18, wire 17, pin 14, spring-contact 16, the hour-hand and its hub, and wire 8 to battery 9, sounding the call in room and the buzzer in office. The occupant of the room then gives a short ring to the office by pushing in push-button in telephone-case, (see Fig. 12,) establishing a new circuit, as follows: from battery 50, wire 51, call-bell 52, wire 53, wire 49, push-button 68, wire 67, wire 62 to annunciator-helix, magnetizing the same and attracting the armature thereof, which will disengage itself from the armature-plate, allowing the hinged bar, to which it is secured, to fall, breaking the clock and call battery circuits. The circuit will then continue from helix to wire 62 and wire 54 back to battery. The clerk then disengages the ring of the flexible conductor from the time-pin and pushes up the annunciator-plate, so that it will again engage with the armature by means of horizontal rod 35$^a$, vertical rod 35$^b$, and knob 35$^c$.

The clerk can call up the occupant of the room as follows: (see Fig. 14:) He gives the push-button 60 corresponding with the number of the room a short push, establishing a circuit as follows: from clock-battery 50, wire 51, ball 52, wire 53, wire 49, bell 48, battery 47, wire 46, switch 42, wire 41, annunciator and armature, and armature-plate, hinged arm 38, annunciator-frame 36, wire 30, binding-post 24, wire 61, push-button 60, wire 59, wire 54, and back to battery. The plug 70 of the office-receiver is then inserted in the hole 69$^a$ of the plate of said push-button, and the receivers being disengaged from their hooks the bell-circuits will be cut out and the telephone-circuits cut in, as usual. If the guest desires to communicate with a guest in another room, he calls up the clerk and notifies him of the number of such room. The other guest is then called up, and the plugs 76 of one of the conductors 75 are placed by the clerk in the holes 69$^a$ of the plates 69 of such rooms. The guest then unhooks the receivers, and the telephones are cut in. (See Fig. 17.)

By my improved system any one or any number of guests may be automatically called at any predetermined time without the other guests being disturbed, and in case of fire all the guests may be called simultaneously.

Having thus fully described my invention, what I claim is—

1. In a hotel electric call apparatus, the combination with the clock, the dial having an annulus provided with holes, and the hour-hand provided with a spring-contact, the wire electrically connected with the hub of the hour-hand, and the battery connected with said wire, of the pins seated in said holes, the wires connected therewith, the cabinet, the time-pins, the flexible conductors having rings adapted to engage with said time-pins, the binding-posts with which said rings are connected, the annunciators electrically connected with said binding-posts, the hinged arms having annunciator-plates, the hinged armatures, the helices, the wires wound around the same and connected with a wire connected with a battery and with the terminal of a series of push-buttons, and the wire connecting the other terminal of said push-buttons with said binding-posts; substantially as described.

2. In a hotel call apparatus, the combination with the cabinet made in two sections hinged to each other, the clock, the dial having an annulus provided with equidistant holes, the hour-hand provided with a spring-contact, the wire electrically connected with the hub of the hour-hand and with a battery, the pins located in said holes, the time-pins connected with the cabinet and electrically connected therewith, the flexible conductors having one end passing through a series of holes in the front of the cabinet and provided with rings adapted to engage with said time-pins, the pulleys and weights connected with said conductors, and the binding-posts to which the other ends of said conductors are secured, of the spring-contacts secured to the rear section of the cabinet, the upper spring-contacts electrically connected therewith, the annunciator-frames, secured to the front section of the cabinet, and electrically connected with said spring-contacts, the hinged arms and annunciator-plates, the hinged armatures, the helices, the wires wound around the same and connected with a wire connected with a battery and with one terminal of a series of push-buttons, and the wires connected with the other terminals of said push-buttons, and with said binding-posts; substantially as described.

3. In a hotel electric call apparatus, the combination with the cabinet, the clock, the dial having an annulus provided with equidistant holes, the hour-hand provided with a spring-contact, the wire electrically connected with the hub of the hour-hand and with a battery, the pins seated in said holes, the time-pins electrically connected therewith, and secured to the cabinet, the flexible conductors passing through holes in the cabinet, having rings adapted to be connected with said time-pins, and the binding-posts with which said conductors are connected, of the upper and lower series of spring-contacts, the connections therewith, the annunciator-frames electrically connected with said spring-contacts, the hinged arms and annunciator-plates, the hinged armatures, the helices, the wires wound around the same, and connected with a wire connected with a battery and with one terminal of a series of push-buttons, the wires connected with the other terminals of the push-buttons and with said binding-posts, the brass plates secured to said push-buttons and having holes adapted to receive the plug of a telephone-receiver; substantially as described.

4. In a hotel electric call apparatus, the combination with the cabinet, the clock, the dial having an annulus provided with a series of equidistant holes, the hour-hand provided with a spring-contact, the wire electrically connected with the hub of the hour-hand, and with a battery, the pins seated in said holes, the time-pins electrically connected therewith, secured to the front of the cabinet, the flexible conductors passing through holes in the cabinet and provided with rings adapted to engage with said time-pins, and the binding-posts to which said conductors are secured, of the electrically-connected upper and lower spring-contacts, the annunciator-frames electrically connected therewith, the hinged arms and annunciator-plates, the hinged armatures, the helices, the wires wound around the same and connected with a wire connected with a battery and with one terminal of a series of push-buttons, the wires connected with the other terminals of the push-buttons and with said binding-posts, the brass plates, having holes, connected with said push-buttons, the shelf at the lower part of the cabinet provided with holes, the weighted flexible conductors having their ends passed through said holes, and the telephone-plugs secured to the ends of said conductors, and adapted to be inserted in the holes in said plates, substantially as described.

5. In a hotel call apparatus, the combination with the cabinet, the clock, the dial having an annulus provided with equidistant holes, the hour-hand provided with a spring-contact, the wires electrically connected with the hub of the hour-hand and with a battery, the pins seated in said holes, the time-pins electrically connected therewith, and secured to the front of the cabinet, the flexible conductors passing through holes in the cabinet, and provided at one end with rings adapted to engage with said time-pins, and the binding-posts to which the other ends of said conductors are secured, of the annunciator-frames electrically connected with said binding-posts the hinged arms and annunciator-plates, the hinged armatures, the helices, the wires wound therearound and connected with a wire connected with the annunciator-battery and with one terminal of a series of push-buttons, the wires connected with the other terminals of said push-buttons and with said binding-posts, the wires connected with said last-mentioned terminals, the spring-contacts connected therewith, the conducting-bar hinged or pivoted to the cabinet, the wire connecting the same with the wire leading to the annunciator-battery, the coiled spring, the pin passing through the cabinet, and the glass plate secured to the front of the cabinet against which the said pin bears; substantially as described.

6. In a hotel electric call apparatus, the combination of the cabinet, the clock, the dial having an annulus provided with a series of equidistant holes, the hour-hand provided with a spring-contact, the wire connected with the hub of the hour-hand and with one terminal of a battery, the buzzer connected with the other terminal of the battery, the wire connected with a call-bell in a room, the battery connected therewith and with a battery and call in another room or rooms, the switches, the push-buttons and the wires connected with said switches, the annunciator-helices around which said wires are wound and the wire connected therewith leading to the annunciator-battery and connected with one terminal of a series of push-buttons, the wires connected with the other terminals of said push-buttons, the binding-posts, the flexible conductors connected therewith passing through holes in the cabinet and provided with rings, the time-pins with which said rings are adapted to engage, the pins seated in the holes in the annulus and electrically connected with the time-pins, and the cabinet-bell electrically connected with the annunciator-battery and with the wire connecting the buzzer and room-call, and the telephones in the cabinet and rooms; substantially as described.

In testimony that I claim the foregoing as my own I have hereunto affixed my signature in presence of two witnesses.

ALBERT B. CHANCE.

Witnesses:
MORRIS H. ARNOLD,
A. L. COX.